(12) United States Patent  
Thompson et al.

(10) Patent No.: US 6,715,748 B2
(45) Date of Patent: Apr. 6, 2004

(54) MODULAR SPECIAL PURPOSE BOARD

(75) Inventors: Ted Thompson, Imboden, AR (US); Mike Neshat, Jonesboro, AR (US)

(73) Assignee: The Scott Fetzer Company, Westlake, OH (US)

( * ) Notice: Subject to any disclaimer, the term of this patent is extended or adjusted under 35 U.S.C. 154(b) by 88 days.

(21) Appl. No.: 10/238,657

(22) Filed: Sep. 11, 2002

(65) Prior Publication Data

US 2004/0046301 A1 Mar. 11, 2004

(51) Int. Cl.[7] .................................................. B23G 3/00
(52) U.S. Cl. ............................ 269/289 R; 269/302.01; 269/13; 269/315; 269/303
(58) Field of Search ........................ 269/289 R, 302.01, 269/13, 315, 303

(56) References Cited

U.S. PATENT DOCUMENTS

| 1,403,883 | A | * | 1/1922 | Woods | 269/13 |
|---|---|---|---|---|---|
| 2,931,551 | A | * | 4/1960 | Zalkind | 225/93 |
| 2,935,107 | A | * | 5/1960 | Bertelsen | 146/215 |
| 4,815,866 | A | * | 3/1989 | Martone | 383/34.1 |
| 5,382,009 | A | * | 1/1995 | Mertz et al. | 269/16 |
| 5,527,022 | A | * | 6/1996 | Gibson | 269/13 |
| 5,551,558 | A | * | 9/1996 | Bureau | 206/223 |
| 5,901,763 | A | * | 5/1999 | You | 144/286.5 |
| 6,206,356 | B1 | * | 3/2001 | Beloff | 269/289 R |
| 6,302,273 | B1 | * | 10/2001 | Edmunds | 206/575 |
| 6,460,841 | B1 | * | 10/2002 | Durr | 269/289 R |

* cited by examiner

Primary Examiner—Joseph J. Hail, III
Assistant Examiner—Daniel Shanley
(74) Attorney, Agent, or Firm—Dennis B. Haase

(57) ABSTRACT

A modular cutting board having especial utility in non kitchen environments in which at least two plates are hingeably connected, and being relatively movable between a working position in which the cutting board presents a broad coplaner working surface and a transport and storage position in which the working surfaces of the plates are in face to face relation.

12 Claims, 2 Drawing Sheets

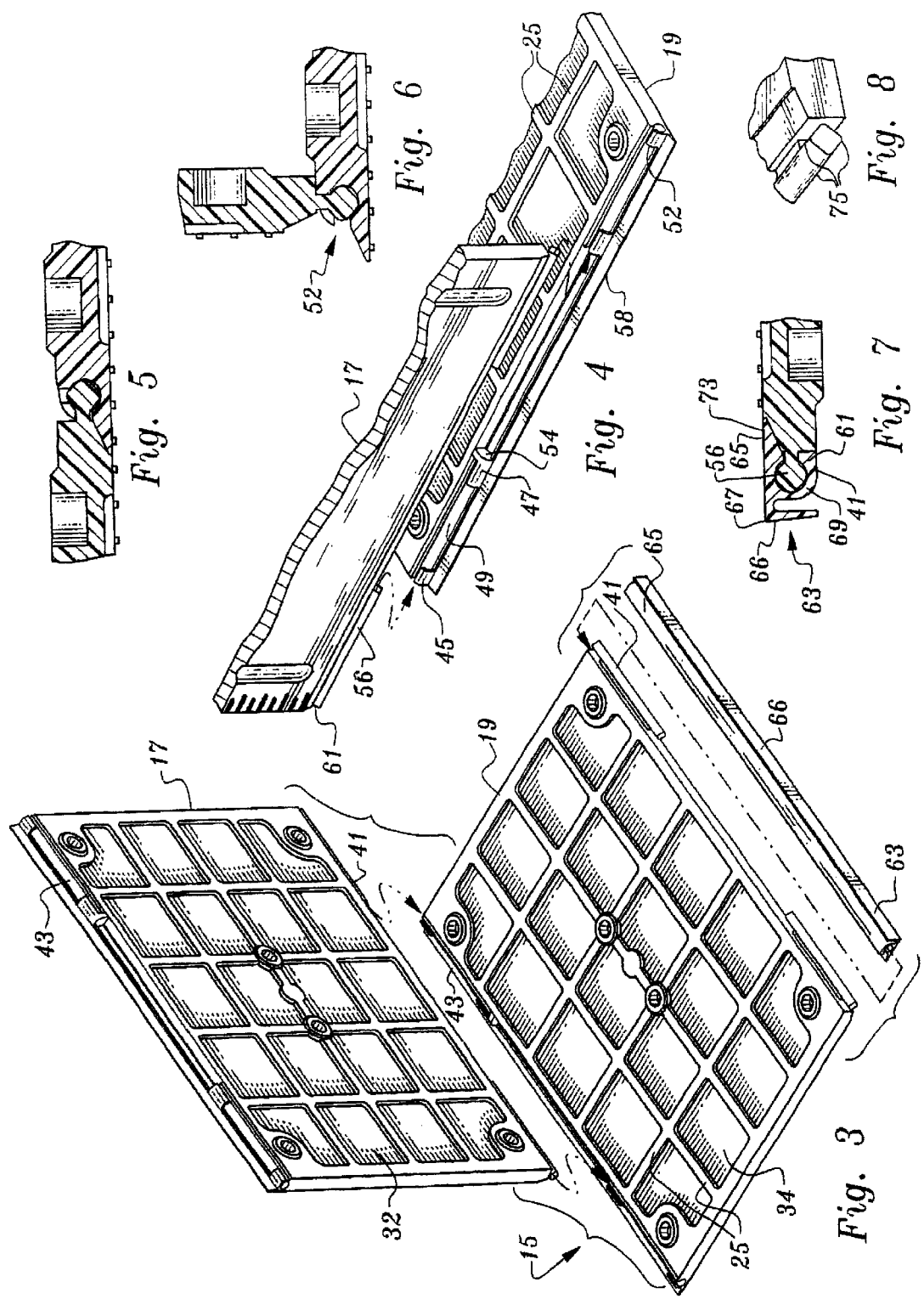

MODULAR SPECIAL PURPOSE BOARD

The present invention relates generally to special purpose cutting boards, and, more particularly, to a board that can serve multiple functions, particularly for the sportsman in the field and, further, is modular and, as such, may be size adjusted to serve a particular purpose and collapsed for storage and transportation. It is also useful in the kitchen.

BACKGROUND OF THE INVENTION

1. Field of the Invention

Cutting boards have been a kitchen staple since the memory of man runneth not to the contrary. Early cutting boards were made of wood and were dimensioned to fit on the kitchen counter. Later, they were integrated into kitchen cabinetry and were slidable into a storage position and pulled out for use.

As counter materials became more sophisticated and artificial substances became popular, e.g., Corfam®, cutting boards began to surface in like materials.

However, existing boards were often heavy, necessarily bulky and generally not considered portable in the sense that they were more of a nuisance to handle, store, clean and use in, e.g., a camp environment, than they were worth.

The resolution of this real world practical problem is addressed by the present invention, which comprises a cutting board designed for use in the field, although being still utilitarian in the kitchen.

2. Overview of the Prior Art

A search of retail outlets, the Internet, and the patent art reveals an appalling lack of useful alternatives, and, as described above, the existing cutting boards do not meet the needs of the outdoorsman.

SUMMARY OF THE INVENTION

The present invention comprises a cutting board which is an ideal tool for use in a campsite or the like, where the usual and normal kitchen environment is unavailable, but the need for an appropriate flat surface for, by way of example, fileting a freshly caught fish, carving and deboning freshly bagged game, or simply cutting up vegetables, potatoes, fruits, and other food stuffs in preparation for cooking or consumption, is present.

It is, accordingly, an important objective of the present invention to provide a sportsman, camper or others with a board having a flat surface of such size and shape as to be readily portable to a camp site or the like and useable for any and all purposes commonly associated with cutting boards.

It is another objective, consonant with the forgoing, to provide such a cutting board which is adjustable in dimension to accommodate any and all tasks which an outdoorsman might encounter while outside the ready access to his or her kitchen.

Yet another objective of the present invention is to provide a cutting board which is readily manipulated by the user to extend or diminish its size and is very safe and hazard free, to the extent that its use under less than ideal conditions poses no particular threat of harm to a user, even in the great outdoors.

A further objective of the present invention is to provide a multi purpose board having a flat work surface which is impervious to contaminates such as fluids from animals carved, deboned or otherwise fileted on the board.

Certainly other and further advantages and benefits to be derived from the present invention will be appreciated, especially by those skilled in the art, when the forthcoming Detailed Description of a Preferred Embodiment is read in conjunction with the appended drawings, wherein:

BRIEF DESCRIPTION OF THE DRAWINGS

FIG. 3 is an exploded view of the board of FIG. 2, showing the various elements thereof and the manner in which they interact;

FIG. 4 is a partially broken view of the board of the present invention, permitting an enlarged view of the hinge which interconnects companion elements which comprise a preferred embodiment of the board FIG. 5 is a partial sectional view of the hinge of FIG. 4, showing the two engaged elements as they would appear with the board opened for use;

FIG. 6 is a view in the nature of FIG. 5, but with the engaged elements in position for disengagement to facilitate transportation and storage;

FIG. 7 is a cross sectional view, broken and enlarged to show the interrelationship of the forward end cap of the board; and FIG. 8 is an enlarged perspective view of the end of the hinge pin illustrating its rectangular profile which enhances a locking feature of the present invention.

DETAILED DESCRIPTION OF A PREFERRED EMBODIMENT

Figure 1:
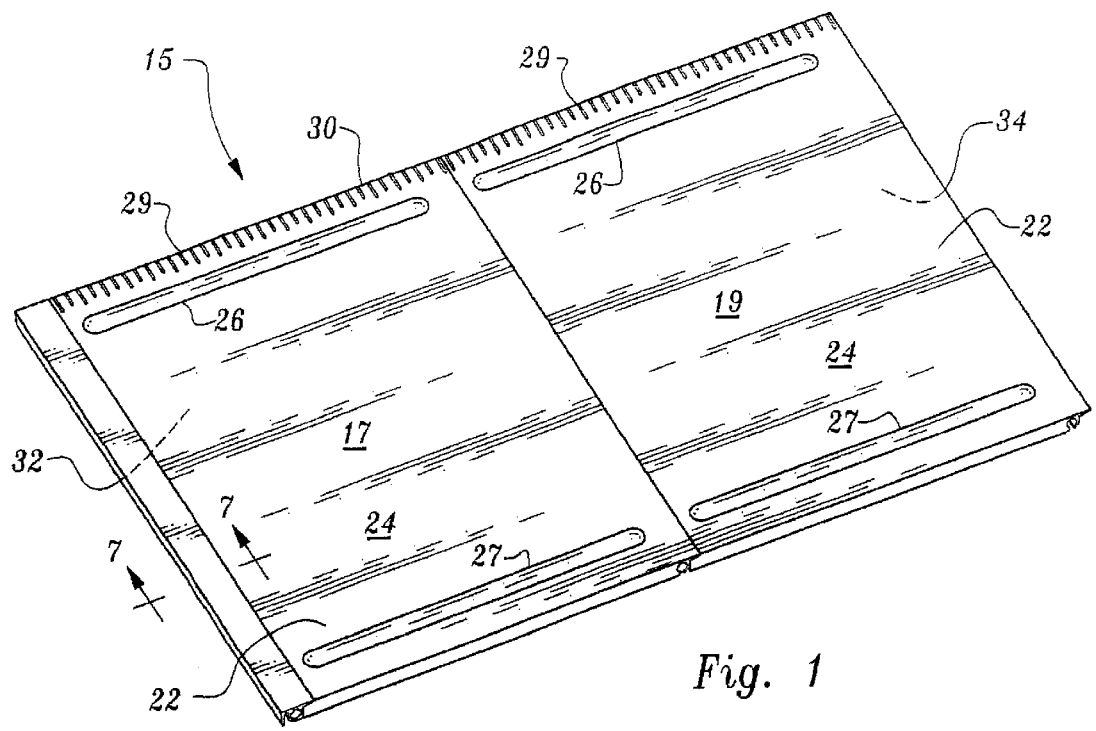
FIG. 1 is a pictorial view of a cutting board constructed in accordance with the present invention, shown in perspective and looking at the working surface thereof.
Figure 2:
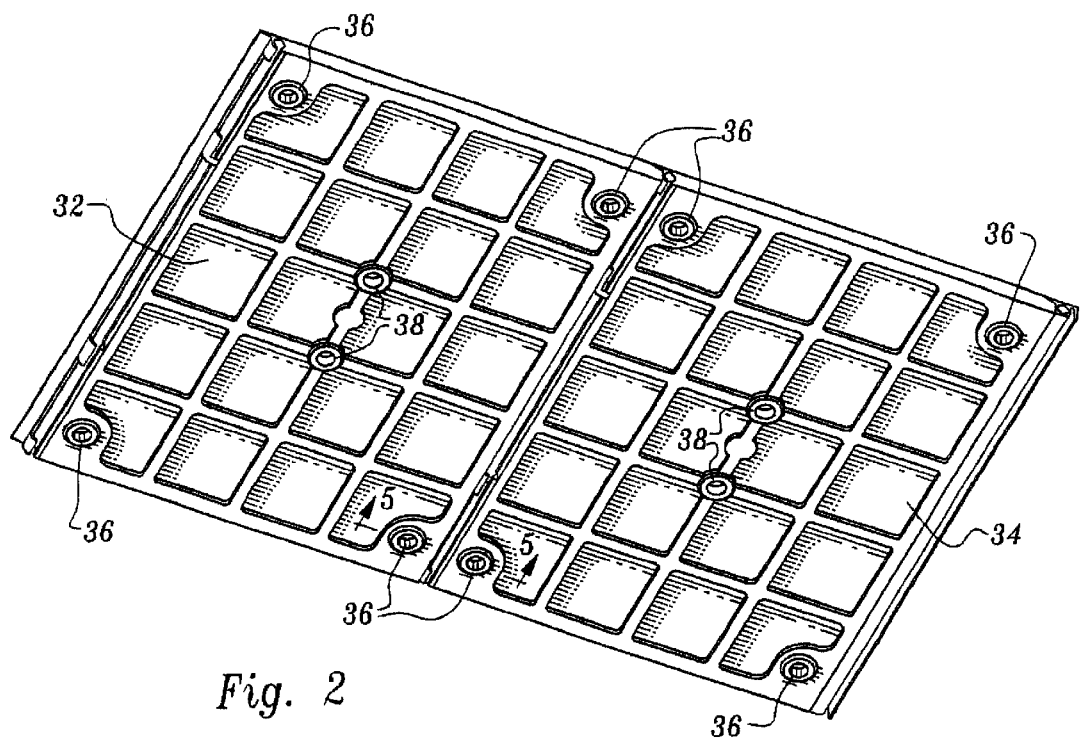
FIG. 2 is a view in the nature of FIG. 1, but showing the underside thereof.

With reference now to the drawings, and initially to FIGS. 1, 2 and 3, a modular cutting board 15 is shown as having been constructed in accordance with the present invention for especial utility in a non kitchen environment, such as at camp sites, deer camps and the like, and comprising, in this preferred form, a pair of substantially identical panels, or plates, 17 and 19.

Each plate is constructed of a non porous material such as plastic, for example, although the use of glass compositions and even some metals is within the contemplation of the invention. Each plate is shown, for illustrative purposes, as being rectangular in shape, although it will be appreciated that both symmetrical and asymmetrical configurations are within the contemplation of the invention, with the proviso that there be at least one straight edge, but preferably two parallel edges formed on each.

With reference to FIG. 1, the top, or upper surface, 22 presents a flat working surface 24 flanked by elongate collection troughs 26 and 27. The troughs collect and, by doing so, tend to inhibit spilling, or discharge, of juices which are ever present when a piece of meat or the like is fileted or sectioned on the surface 24.

As an additional useful feature, a measuring scale 29 is provided by molding, or otherwise permanently affixing the same to the surface, and in the illustrated case, along a longitudinal edge 30 shown in FIG. 1 at the top of the plate 17, 19, thereby providing the user with the capacity for an instantaneous visual assessment of his or her catch, as one use, for instance.

The undersides 32 and 34 of the plates 17 and 19, respectively, are shown in FIGS. 2 and 3. Each of the undersides of the surfaces 22, 24 is formed with strengthening ribs 25, shown in this exemplary case as intersecting to define a waffle pattern to enhance strength, especially during rough handling in the field. A series of protuberances in the nature of feet 36 are disposed on the underside of the plates, being preferably located at or near the corners of each plate 17, 19 to provide a stable base particularly under load, and non slip support for the cutting board 15 on virtually every surface that might reasonably be encountered during use. Companion feet 38 are located toward the center of the underside of each plate 15, 17 to enhance the non slip quality of each unit.

With reference now, in particular, to FIGS. 3 through 7, one of the significant features of the cutting board of the present invention is the capacity to conjoin at least two such plates together to multiply the usable working surface of the board. It is readily seen that boards 17 and 19 are hingeably joined along contiguous lateral edges 41 and 43, which flank the flat working surface of each plate 17, 19.

The lateral edge 41 is formed, or otherwise provided with, the female part of a hinge and includes a series of loops, or knuckles, 45, 47 which together define at least one channel 49 along that edge. In the illustrated case, there are two pairs of such knuckles, and it will be observed that they do not close at the top. Rather, a space 52 is provided which is approximately parallel to the underside 32, 34 of each plate. A stop wall 54 is provided at one of the knuckles 47 and may be integrally formed therewith.

The lateral edge 43 is formed or otherwise provided with the male part of the hinge of the present invention and, to that end, includes a pair of axially aligned hinge pins 56, 58. The hinge pins are disposed on, and supported by, an extension 61 which places the axis of the hinge pins at a predetermined distance from the lateral edge 43 which supports them, which, as will become apparent hereinafter, permits relative movement by and between hinged plates between an open, in use, and closed, transportable, position.

The hinge pins 56 and 58 are so dimensioned as to fit snugly, although not frictionally engaged, within the grasp of the knuckles 45, 47 while being capable of rotation within the same in the plane of the hinge pins. In order to assemble the plates into a cutting board and with visual reference to the exploded view of FIG. 3, the edge 43 of a plate 17 is placed in contiguous relation with the edge 41 of a companion plate 19, and then moved axially in order that the hinge pins are inserted into the knuckles, until at least one of the pins abuts the stop wall 54. At that point, the plates are aligned, and the flat working surface of each is coplaner so as to present an uninterrupted surface for performing useful work commensurate with those tasks performed on the more traditional kitchen board.

When work is done and it is time to clean, store and transport, it will be seen that the width of the extension 61 is only slightly less than the width of the space 52 defined between the terminus of the knuckle and the edge 41 of the plate. This not only permits the hinge to be assembled with particular ease, but articulated as best seen in FIGS. 5 and 6. In FIG. 5, the companion plates are in a flat, working position in which the working surfaces are coplaner, and, in accordance with the invention, may be moved to a 90° position as seen in FIG. 6, disengaged, and the working surfaces of each plate placed together in face to face relation for storage and transportation.

While two such plates constructed in accordance with the present invention are illustrated, it is clear that additional plates may be joined at the instance of the user at some point and edge 41 will be exposed, creating the prospect that exposed hinge pins might catch on clothing or other loose impediments, which not only looks bad, but poses the possibility of injury or harm in some form to those in proximity to the cutting board 15.

The uninviting prospect described is ameliorated by the addition of a safety cap 63. The safety cap 63 has a pair of smooth surfaces 65, 66 which are softly joined at their contiguous corners to form the edge 67 and thereby provide a safe and attractive cap on the edge 41. In order to permit engagement of the hinge pins along the edge 41, the cap 63 is formed with a channel 69, defined by an elongate knuckle 71 adapted to receive the hinge pins. A stop surface 73 secures the cap against rotation and creates a smooth transition to the working surface of the plate to which it is attached.

Finally, and with respect to FIG. 8, it will be seen that the hinge pins are not circular in cross section, but rather have locking edges, or ears, 75. These ears 75 frictionally engage the channels formed by the knuckles 45, 47 with sufficient force to permit the board to be effectively locked in both extended and intermediate positions to the extent that such provides a value to the user.

It will be appreciated by those skilled in the art that while a preferred embodiment of the present invention has been described in considerable detail, some variation is clearly within the contemplation of the invention, and may be made without departure therefrom.

Having thus described the preferred embodiment, what is now claimed is:

1. A modular cutting board primarily for use in sites outside a kitchen environment, comprising:

at least two plates having a pair of parallel lateral edges made of a non absorbent material; said plates being integrally connected such that said plates may be rotated between an open position in which a flat planar working surface is presented to the user, intermediate positions in which said plates present other than a flat planar working surface and said plates being detachable to effect a closed transport and storage position wherein said plates are in face to face relation;

knuckles formed on one of said lateral edges at least one of said knuckles having a stop wall;

hinge pins formed on the other said lateral edge; said hinge pin being non circular in cross section so aligned and dimensioned as to be slidably received in said knuckles, abutting said stop wall in an adjacent plate to thereby hingeably conjoin said plate such that said plates are movable relative to one another to a working position in which the flat surfaces of each said plate are coplaner, and disengaged for movement to a storage position in which said flat surfaces of said plates are in face to face relation.

2. The modular cutting board of claim 1, wherein each said plate is provided with an under surface, said under surface being formed with a series of intersecting ribs.

3. The modular cutting board of claim 2, wherein said ribs are interconnected in a waffle pattern.

4. The modular cutting board of claim 1, wherein a safety cap is provided, said safety cap having a relatively smooth surface, said safety cap being engageable with said plate by attachment to said hinge pins to thereby inhibit inadvertent contact with otherwise exposed hinge pins.

5. The modular cutting board of claim 2, wherein a series of feet are provided, said feet depending from said underside of said plate and providing stability to said plate, particularly when under load.

6. The modular cutting board of claim 1, wherein said hinge sins having ears formed thereon, said ears acting in concert with said knuckles to cause a locking action as between adjacent said plates when in position.

7. A plate for use in combination with like plates to form a modular cutting board comprised of at least two such plates, each said plate comprising:

- a flat surface formed on one side of said plate;
- a pair of parallel lateral edges flanking said flat surface;
- at least one knuckle defined along one of said lateral edges, a stop wall in at least one knuckle;
- at least one hinge pin formed along the other said lateral edge, said hinge pin being non circular in cross section, and positioned at a predetermined distance from said lateral edge;
- said hinge pin being dimensioned to fit into said knuckle on an adjacent said plate such that said plates may be rotated between an open position in which a flat planar working surface is presented to the user, intermediate positions in which said plates present other than a flat planar working surface and said plates being detachable to define a closed transport and storage position wherein said plates are in face to face relation.

8. The plate of claim 7, wherein said flat surface of each said plate is provided with a measuring scale.

9. The plate of claim 7, wherein said flat surface is provided with at least one collection trough.

10. The plate of claim 7, wherein each said plate is provided with an under surface, said under surface being formed with a series of intersecting ribs.

11. The plate of claim 7, wherein said ribs are interconnected in a waffle pattern.

12. The plate of claim 11, wherein each said plate is provided with an under surface, said under surface being formed with a series of intersecting ribs.

* * * * *